(12) United States Patent
Li et al.

(10) Patent No.: US 9,851,725 B2
(45) Date of Patent: Dec. 26, 2017

(54) DRIVE CONTROL DEVICE AND METHOD FOR ELECTRONIC EXPANSION VALVE

(75) Inventors: Xizhi Li, Qingdao (CN); Yuping Deng, Qingdao (CN); Xianlin Zhang, Qingdao (CN); Shuliang Huang, Qingdao (CN)

(73) Assignees: Qingdao Hisense Hitachi Air-Conditioning Systems Co., Ltd., Shandong (CN); Hisense USA CORP, Suwanee, GA (US)

( * ) Notice: Subject to any disclaimer, the term of this patent is extended or adjusted under 35 U.S.C. 154(b) by 599 days.

(21) Appl. No.: 14/370,480

(22) PCT Filed: Jun. 21, 2012

(86) PCT No.: PCT/CN2012/077306
§ 371 (c)(1),
(2), (4) Date: Jul. 2, 2014

(87) PCT Pub. No.: WO2013/170519
PCT Pub. Date: Nov. 21, 2013

(65) Prior Publication Data
US 2014/0343735 A1    Nov. 20, 2014

(30) Foreign Application Priority Data

May 17, 2012   (CN) .......................... 2012 1 0154137

(51) Int. Cl.
*G05D 7/06*       (2006.01)
*F25B 49/00*      (2006.01)
(Continued)

(52) U.S. Cl.
CPC ......... *G05D 7/0617* (2013.01); *F25B 41/062* (2013.01); *F25B 49/00* (2013.01);
(Continued)

(58) Field of Classification Search
None
See application file for complete search history.

(56) References Cited

U.S. PATENT DOCUMENTS

| 9,360,243 B1 * | 6/2016 | Cowans | F25B 49/02 |
| 2007/0040138 A1 * | 2/2007 | Sekiya | F16K 11/0743 |
| | | | 251/129.11 |
| 2012/0187202 A1 * | 7/2012 | Suzuki | F25B 41/062 |
| | | | 236/92 B |

FOREIGN PATENT DOCUMENTS

| CN | 101989077 A | 3/2001 |
| CN | 101241350 A | 8/2008 |

(Continued)

OTHER PUBLICATIONS

International Search Report with English translation, dated Feb. 14, 2013 for corresponding International Application No. PCT/CN2012/077306.

*Primary Examiner* — Tuan Dao
(74) *Attorney, Agent, or Firm* — Intellectual Property Law Group LLP

(57) ABSTRACT

A drive control device and method for an electric expansion valve is disclosed. In the disclosure, before applying a drive pulse signal corresponding to a rotary pulse number to a motor of the electronic expansion valve, a secondary positioning is performed on a relative position between stator magnetic field of the motor and rotor magnetic field of the motor by applying a holding current of a first duration time to the motor, applying an pulse signal of an additional pulse number to the motor, and applying a holding current of a second duration time to the motor, and a same secondary positioning operation is also performed on the motor after applying the drive pulse signal corresponding to the rotary pulse number to the motor of the electronic expansion valve, which ensures that the electronic expansion valve operates (Continued)

according to the drive pulse signal corresponding to the rotary pulse number.

13 Claims, 4 Drawing Sheets

(51) Int. Cl.
*F25B 41/06* (2006.01)
*G05B 15/02* (2006.01)
*F24F 11/00* (2006.01)

(52) U.S. Cl.
CPC ...... *G05B 15/02* (2013.01); *F24F 2011/0082* (2013.01); *F25B 2341/0653* (2013.01); *F25B 2600/2513* (2013.01); *Y02B 30/72* (2013.01)

(56) References Cited

FOREIGN PATENT DOCUMENTS

| | | |
|---|---|---|
| CN | 101900464 A | 12/2010 |
| JP | 3194361 A | 8/1991 |
| JP | 9243137 A | 9/1997 |

* cited by examiner

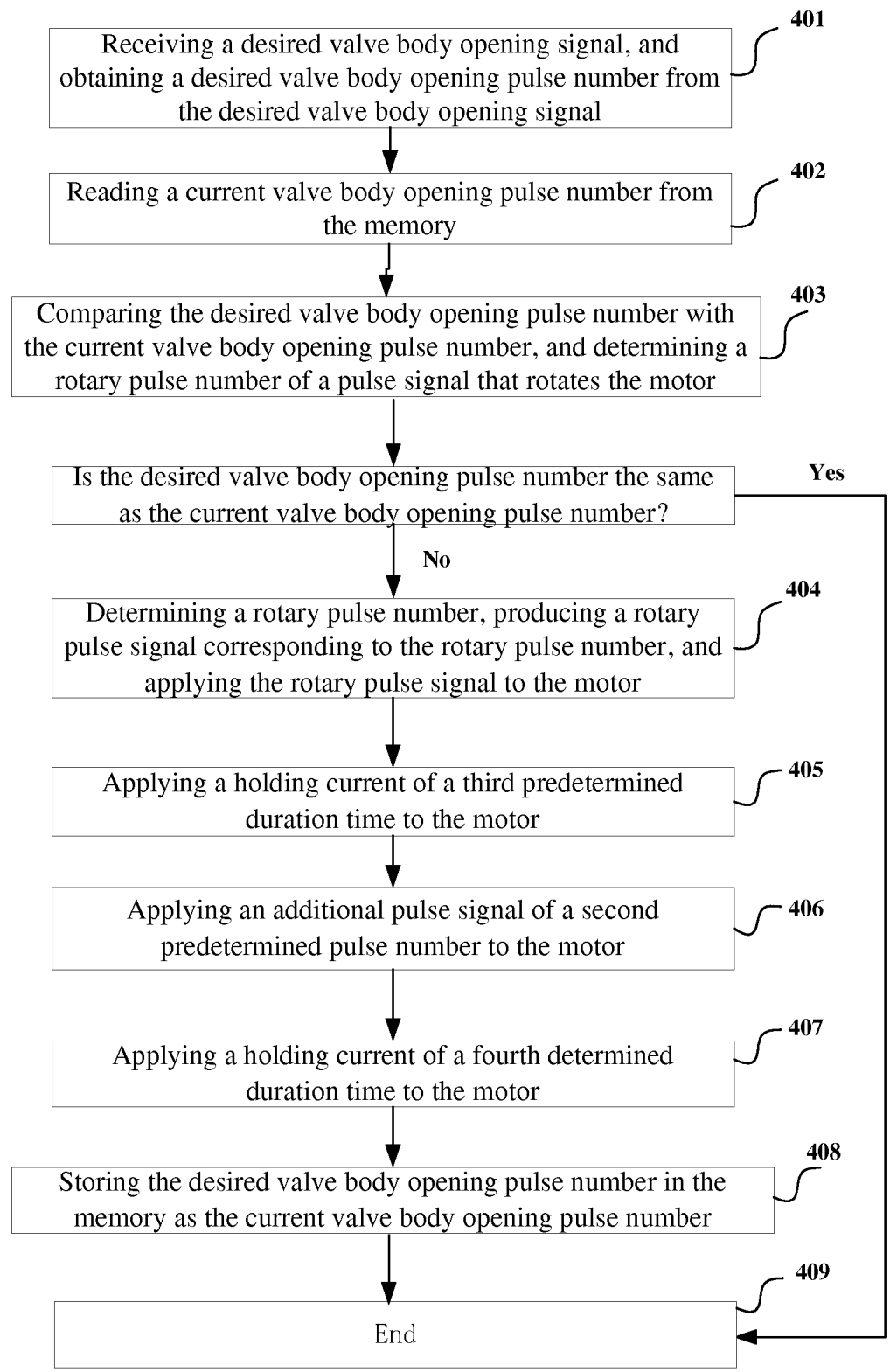

DRIVE CONTROL DEVICE AND METHOD FOR ELECTRONIC EXPANSION VALVE

CROSS-REFERENCE TO RELATED APPLICATIONS

This application is a U.S. National Phase application, under 35 U.S.C. §371, of International Application no. PCT/CN2012/077306, with an international filing date of Jun. 21, 2012, and claims benefit of Chinese Application no. 201210154137.3 filed on May 17, 2012, and which are hereby incorporated by reference for all purposes.

TECHNICAL FIELD

The disclosure relates to an electronic expansion valve technique, and in particular to a drive control device and method for an electronic expansion valve.

BACKGROUND ART

Along with the development of science and technology, the electronic expansion valve has been commonly used in the field of inverter air conditioners. It is a step motor electronic expansion valve that is generally used in the field of air conditioners. The electronic expansion valve comprises a step motor and a valve body, and the opening of the valve body is controlled by the rotation of the step motor. The driving circuit of the step motor is connected with the step motor through a drive wire. When the electronic expansion valve is to be driven, the controller sends a pulse control signal to the driving circuit to thereby drive the step motor to rotate to make the valve body reach a corresponding opening.

However, at present, the application of the electronic expansion valve in the field of inverter air conditioners mainly relates to the technique of how to control the rotation of the step motor according to the change of the temperature and pressure to thereby adjust the opening of the valve body of the electronic expansion valve. In the use of the electronic expansion valve in the prior art, the pressure and temperature are sampled by a temperature and pressure sensor, and the target opening of the electronic expansion valve is controlled based on the collected pressure and temperature and according to a control algorithm. The CPU obtains the opening desired by the electronic expansion valve by calculation and converts it into a corresponding pulse signal, which drives the step motor of the electronic expansion valve by a driver, and the step motor drives the valve body to rotate to thereby adjust the opening of the electronic expansion valve. As mentioned above, many mature techniques, which are not greatly different, are existing in terms of the macro-control of the valve body opening of the electronic expansion valve, but few of them relate to the control details of the electronic expansion valve, i.e., the drive technique of starting and stopping the electronic expansion valve itself. Due to the overlook in terms of the control details, that the drive is out of step generally appears in the electronic expansion valve in use, and the electronic expansion valve cannot be effectively driven and cannot effectively keep the current opening and the like.

Especially, the control manner of the start of the electronic expansion valve in the prior art is as follows: after the electronic expansion valve was stopped last time, and when the target pulse signal changes, the electronic expansion valve is directly turned on and off at a normal operating rate directly from the current pulse signal. There is not anything wrong in such drive manner of the electronic expansion valve in normal circumstances. However, there are two circumstances that will render the electronic expansion valve unable to effectively act. The first circumstance is that when the electronic expansion valve has not been used over a long period of time or there is oil or a foreign matter adhered or blocked in the valve body, the electronic expansion valve generally cannot be effectively driven due to an insufficient starting torque of the motor, which causes a case of slip and step-out, so that the electronic expansion valve cannot be effectively turned on and off. The second circumstance is that after the stop of the motor of the electronic expansion valve, a current is applied to the stop pulse signal of the electronic expansion valve, thereby making the magnetic field between the stator and the rotor of the motor of the electronic expansion valve form a holding torque, so that the coil of the electronic expansion valve still keeps the rotor in a state when it is stopped in the case of not being electrified. However, in actual circumstances, under the impact of the refrigerant pressure and the like, the rotor of the motor of the electronic expansion valve will be inevitably displaced. The start is performed according to the pulse position where the electronic expansion valve was stopped last time in the case that the rotor is displaced, and the case that the start is out of step is generally caused due to the deviation of the position of the rotor.

In addition, the control manner of the stop of the electronic expansion valve in the prior art is as follows: generally, after the electronic expansion valve operates to reach the target pulse, a current of 50 ms or more is further continuously applied to the electronic expansion valve to increase the holding torque of the electronic expansion valve to prevent the S pole or the N pole of the rotor magnetic field of the motor of the electronic expansion valve from being misplaced from the N pole or S pole of the stator magnetic field. However, in actual circumstances, it still hardly ensure that the S pole or the N pole of the rotor magnetic field of the motor of the electronic expansion valve is not misplaced from the N pole or S pole of the stator magnetic field only by further continuously applying a current of 50 milliseconds or more to the electronic expansion valve after the electronic expansion valve operates to reach the target pulse.

Thus, the drive technique of starting and stopping the electronic expansion valve in the prior art still hardly overcome the defect that the electronic expansion valve cannot be effectively driven due to an insufficient starting torque of the motor and the defect that the start is out of step due to the deviation of the relative position between the rotor and the stator, and cannot ensure that the valve body opening of the electronic expansion valve is correctly controlled. However, in the field of inverter air conditioners, especially in the field of commercial inverter-driven multi-split air conditioners, the opening of the electronic expansion valve has an irreplaceable function on the control of the entire air conditioning system. Thus, whether or not the electronic expansion valve can be correctly turned on, whether or not the opening is proper and whether or not the current opening can be kept decide the performance and reliability of the air conditioning system. And in order obtain a good performance and reliability, the drive technique capable of correctly driving the electronic expansion valve is the key as for whether or not a product of an air conditioning system is successful.

Thus, there exists a need for a technique capable of effectively controlling the start and stop of the electronic expansion valve to ensure that the valve body opening of the electronic expansion valve is correct.

SUMMARY OF THE DISCLOSURE

The embodiments of the disclosure provide a technique capable of effectively controlling start and stop of an electronic expansion valve to ensure that a valve body opening of electronic expansion valve is correct.

According to one aspect of the disclosure, a drive control device for an electronic expansion valve is provided. Before starting the electronic expansion valve, a secondary positioning is performed on the motor of the electronic expansion valve to overcome the defect that the electronic expansion valve cannot be effectively driven due to an insufficient starting torque of the motor and the defect that the start is out of step due to the deviation of the relative position between the rotor and the stator, and further after applying a rotary pulse number to the motor of the electronic expansion valve, a secondary positioning is performed on the motor of the electronic expansion valve again to enhance the torque of the motor to achieve that the rotor of the motor of the electronic expansion valve will not be displaced due to a refrigerant pressure change and the like after the stop of the motor.

The drive control device comprises: a processing unit for receiving a desired valve body opening signal of the electronic expansion valve and determining a desired valve body opening pulse number according to the desired valve body opening signal, and obtaining a rotary pulse number of a pulse signal required to rotate the motor of the electronic expansion valve based on the desired valve body opening pulse number and a current valve body opening pulse number; a driving signal generating circuit for producing an additional pulse signal of a predetermined pulse number under control of the processing unit and producing a drive pulse signal of a corresponding pulse number according to the rotary pulse number, and producing a holding current of a predetermined duration time under control of the processing unit; and a driving circuit for performing power amplifications on the additional pulse signal and the drive pulse signal respectively and applying them to the motor to rotate the motor, and performing a power amplification on the holding current of the predetermined duration time outputted from the driving signal generating circuit and applying it to the motor to produce a torque that achieves positioning a relative position between stator and rotor magnetic fields of the motor.

Wherein the driving signal generating circuit producing a holding current of a predetermined duration time under control of the processing unit comprises: the driving signal generating circuit producing a first holding current of a first predetermined duration time when the processing unit determines that the desired valve body opening pulse number is not equal to the current valve body opening pulse number; and the driving signal generating circuit producing a second holding current of a second predetermined duration time after the driving circuit drives the motor according to an additional pulse signal of a first predetermined pulse number.

Wherein the driving signal generating circuit producing a holding current of a predetermined duration time under control of the processing unit comprises: the driving signal generating circuit producing a third holding current of a third predetermined duration time after the driving circuit drives the motor according to the drive pulse signal; and the driving signal generating circuit producing a fourth holding current of a fourth predetermined duration time after the driving circuit drives the motor according to an additional pulse signal of a second predetermined pulse number.

According to another aspect of the disclosure, a drive control method for an electronic expansion valve is provided. The method performs, before starting the electronic expansion valve, a secondary positioning on the motor of the electronic expansion valve to overcome the defect that the electronic expansion valve cannot be effectively driven due to an insufficient starting torque of the motor and the defect that the start is out of step due to the deviation of the relative position between the rotor and the stator, and the method can further perform, after applying a rotary pulse number to the motor of the electronic expansion valve, a secondary positioning on the motor of the electronic expansion valve again to enhance the torque of the motor to achieve that the rotor of the motor of the electronic expansion valve will not be displaced due to a refrigerant pressure change and the like after the stop of the motor. The drive control method comprises the steps of: receiving a desired valve body opening signal of the electronic expansion valve, and determining a desired valve body opening pulse number according to the desired valve body opening signal; applying a first holding current of a first predetermined duration time to the motor to produce a torque that achieves positioning a relative position between stator and rotor magnetic fields of the motor when the desired valve body opening pulse number is different from a current valve body opening pulse number; applying a first additional pulse signal of a first predetermined pulse number to the motor of the electronic expansion valve after performing a power amplification thereon, and then applying a second holding current of a second predetermined duration time to the motor to produce a torque that achieves positioning a relative position between stator and rotor magnetic fields of the motor; and determining a rotary pulse number that rotates the motor according to the desired valve body opening pulse number and the current valve body opening pulse number, producing a drive pulse signal corresponding to the rotary pulse number based on the rotary pulse number, and applying the drive pulse signal to the motor of the electronic expansion valve after performing a power amplification thereon.

Wherein receiving a desired valve body opening signal of the electronic expansion valve and determining a desired valve body opening pulse number according to the desired valve body opening signal comprises: using, if the desired valve body opening signal is a pulse number, the pulse number as the desired valve body opening pulse number; and converting, if the desired valve body opening signal is an angle signal, the angle signal into a pulse number of a pulse signal corresponding to the angle signal according to a predetermined algorithm, and using it as the desired valve body opening pulse number.

The drive control method further comprises: storing the desired valve body opening pulse number in the memory to serve as the current valve body opening pulse number.

Wherein, after producing a drive pulse signal corresponding to the rotary pulse number based on the rotary pulse number, and applying the drive pulse signal to the motor of the electronic expansion valve after performing a power amplification thereon, the method further comprises: applying a third holding current of a third predetermined duration time to the motor to produce a torque that achieves positioning a relative position between stator and rotor magnetic fields of the motor.

Wherein, after applying a third holding current of a third predetermined duration time to the motor to produce a torque that achieves positioning a relative position between stator and rotor magnetic fields of the motor, the method further comprises: applying a second additional pulse signal of a second predetermined pulse number to the motor of the electronic expansion valve, and then applying a fourth holding current of a fourth predetermined duration time to the motor to produce a torque that achieves positioning a relative position between stator and rotor magnetic fields of the motor.

According to a further aspect of the disclosure, a drive control method for an electronic expansion valve is provided. The drive control method performs, after applying a rotary pulse number to the motor of the electronic expansion valve, a secondary positioning on the motor of the electronic expansion valve again to enhance the torque of the motor to achieve that the rotor of the motor of the electronic expansion valve will not be displaced due to a refrigerant pressure change and the like after the stop of the motor; and the drive control method can also apply, before starting the electronic expansion valve, a current of a predetermined duration time to the electronic expansion valve to perform a primary positioning on the motor to overcome the defect that the electronic expansion valve cannot be effectively driven due to an insufficient starting torque of the motor. The drive control method comprises the steps of: receiving a desired valve body opening signal of the electronic expansion valve, and determining a desired valve body opening pulse number according to the desired valve body opening signal; determining a rotary pulse number that rotates the motor of the electronic expansion valve according to the desired valve body opening pulse number and a current valve body opening pulse number, producing a drive pulse signal corresponding to the rotary pulse number based on the rotary pulse number, and applying the drive pulse signal to the motor of the electronic expansion valve after performing a power amplification thereon; applying a third holding current of a third predetermined duration time to the motor after performing a power amplification thereon to produce a torque that achieves positioning a relative position between stator and rotor magnetic fields of the motor; and applying an additional pulse signal of a second predetermined pulse number to the motor of the electronic expansion valve after performing a power amplification thereon, and then applying a fourth holding current of a fourth predetermined duration time to the motor after performing a power amplification thereon to produce a torque that achieves positioning a relative position between stator and rotor magnetic fields of the motor.

Wherein receiving a desired valve body opening signal of the electronic expansion valve and determining a desired valve body opening pulse number according to the desired valve body opening signal comprises: using, if the desired valve body opening signal is a pulse number, the pulse number as the desired valve body opening pulse number; and converting, if the desired valve body opening signal is an angle signal, the angle signal into a pulse number of a pulse signal corresponding to the angle signal according to a predetermined algorithm, and using it as the desired valve body opening pulse number.

Wherein, before determining a rotary pulse number making the motor of the electronic expansion valve rotate according to the desired valve body opening pulse number and a current valve body opening pulse number, the method further comprises: applying a first holding current of a first predetermined duration time to the motor after performing a power amplification thereon to produce a torque that achieves positioning a relative position between stator and rotor magnetic fields of the motor.

Wherein the current valve body opening pulse number is stored in a memory.

The drive control method further comprises: storing the desired valve body opening pulse number in the memory to serve as the current valve body opening pulse number.

Wherein each of the first, second, third and fourth duration times is 50 milliseconds to 1 second.

Wherein the first and second predetermined pulse numbers are 1.

BRIEF DESCRIPTION OF THE DRAWINGS

FIG. 4 shows a flow chart of the drive control method for the electronic expansion valve according to a further embodiment of the disclosure.

DETAILED DESCRIPTION

Figure 1:
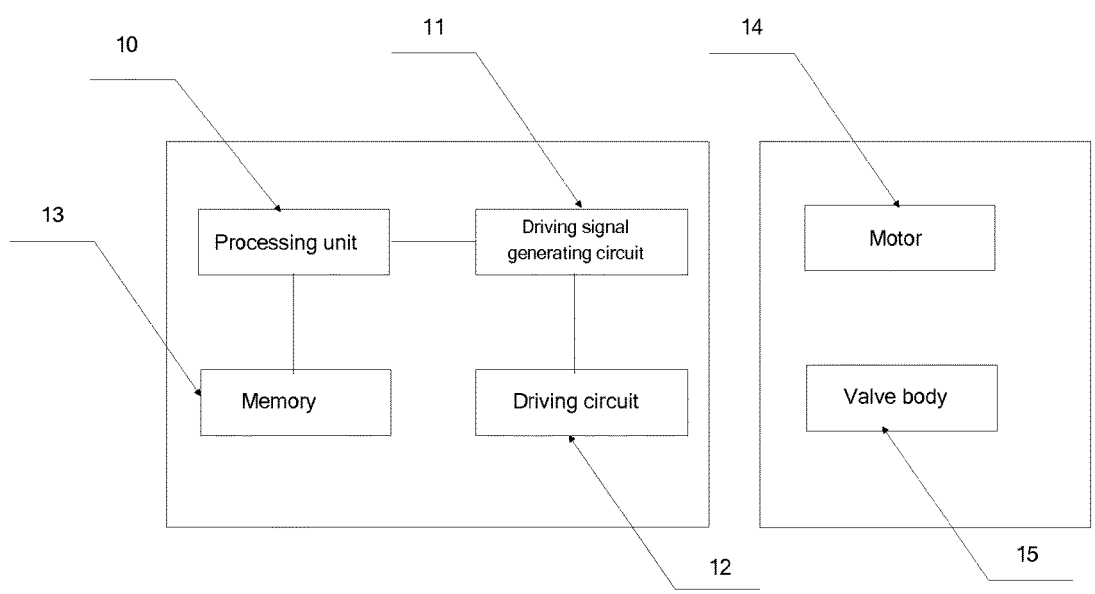
FIG. 1 is a schematic diagram of the structure of the electronic expansion valve equipped with a drive control device of the embodiment of the disclosure.

In order to make the object, the technical solutions and the advantages of the disclosure clear, the disclosure is further described in detail below by referring to the figures and enumerating embodiments. However, it should be noted that many details are only listed in the Description for making the readers have a thorough understanding of one or more aspects of the disclosure, and these aspects of the disclosure can be also achieved even without these details.

The advantages of the electronic expansion valve make the electronic expansion valve be widely applied in the air conditioners, especially the inverter-driven multi-split air conditioners. Generally, the air conditioner and the inverter-driven multi-split air conditioner are both provided with an electronic expansion valve on the outdoor machine and the indoor machine, respectively. During refrigeration, the electronic expansion valve of the outdoor machine is fully opened, and the electronic expansion valve of the indoor machine performs a control of exhaust superheat, so that the system and the compressor are located in a stable and reliable operating area. During heating, the electronic expansion valve of the outdoor machine performs a control of exhaust superheat, and the electronic expansion valve of the indoor machine performs a refrigerant quality distribution according to the capacities of the respective indoor machines, so that the heating effects of the respective indoor machines are optimized. In the refrigerating or heating process of the air conditioner, the technical measure of adjusting the valve body opening of the electronic expansion valve according to the temperature and pressure to thereby control the temperature has been described a lot in the prior art, and details are omitted herein. In the disclosure, the electronic expansion valve refers to an electronic expansion valve using a DC motor technique.

According to the disclosure, in order to overcome the defect that the electronic expansion valve cannot be effectively driven due to an insufficient starting torque of the motor and the defect that the start is out of step due to the deviation of the relative position between the rotor and the stator, a secondary positioning is performed on the position between the rotor and the stator both at the start and the stop of the electronic expansion valve. To sum up, at the start of the electronic expansion valve, a holding current of a predetermined duration time is firstly applied to the motor of the electronic expansion valve, a magnetic field is produced between the rotor and the stator of the motor, and a primary positioning is performed on the position between the rotor and the stator using a torque produced by this magnetic field. Then, an additional pulse signal of a predetermined pulse number is applied to the motor to rotate the motor by a tiny angle, next another holding current of a predetermined duration time is applied to the motor again, and thus a secondary positioning is performed using a torque produced by the magnetic field between the rotor and the stator. Next, a target pulse signal is applied to the motor to rotate the motor by a corresponding angle. Alternatively, after the target pulse signal and when the motor is stopped, a holding current of a predetermined duration time can be also firstly applied to the motor of the electronic expansion valve, a magnetic field is produced between the rotor and the stator of the motor, and a primary positioning is performed on the position between the rotor and the stator using a torque produced by this magnetic field. Next, an additional pulse signal of a predetermined pulse number is applied to the motor to rotate the motor by a tiny angle, next another holding current of a predetermined duration time is applied to the motor, and a secondary positioning is performed using a torque produced by the magnetic field between the rotor and the stator.

Some implementation modes of the disclosure are described below:

FIG. 1 is a schematic diagram of the structure of the electronic expansion valve equipped with a drive control device of the embodiment of the disclosure. As shown in FIG. 1, the electronic expansion valve comprises a drive control device and a body part. The body part comprises a motor 14 and a valve body 15. Those skilled in the art understand that the drive control device can be integrated with the body part, or can be also an independent component that is completely separate from the body part. The drive control device as shown in FIG. 1 comprises a processing unit 10, a driving signal generating circuit 11 and a driving circuit 12. The processing unit 10 receives a desired valve body opening signal of the electronic expansion valve. The desired valve body opening signal is sent out by a master controller (not shown) of the air conditioning system. The desired valve body opening signal can be an angle signal denoting the valve body opening, or a pulse number denoting a pulse signal corresponding to the angle signal of the valve body opening. The processing unit 10 determines the desired valve body opening pulse number according to the desired valve body opening signal. When the desired valve body opening signal is a pulse number, the processing unit 10 uses the pulse number as the desired valve body opening pulse number; and when the desired valve opening signal is an angle, the processing unit 10 converts the angle signal into a pulse number of a pulse signal corresponding to the angle signal denoting the valve body opening according to a predetermined algorithm, and uses it as the desired valve body opening pulse number. The processing unit 10 determines a rotary pulse number of a pulse signal required to rotate the motor of the electronic expansion valve according to the desired valve body opening pulse number and the current valve body opening pulse number, wherein the rotary pulse number is the difference between the desired valve body opening pulse number and the current valve body opening pulse number. In the disclosure, the current valve body opening pulse number is stored in a memory 13, and the memory 13 can be located inside the processing unit 11, and can also serve as an independent component outside the processing unit 11. The driving signal generating circuit 11 produces a drive pulse signal of a corresponding pulse number according to the rotary pulse number determined by the processing unit 10. When the processing unit 10 determines that an additional pulse signal of a predetermined pulse number is to be produced, the driving signal generating circuit 11 produces the additional pulse signal of the predetermined pulse number. The processing unit 10 determines whether to indicate the driving signal generating circuit 11 to produce a holding current and an additional pulse signal of a predetermined pulse number. When the processing unit 10 determines that the desired valve body opening pulse number is different from the current valve body opening pulse number, the processing unit 10 controls the driving signal generating circuit 11 to firstly output a first holding current of a first predetermined duration time; then the driving signal generating circuit 11 outputs an additional pulse signal of a first predetermined pulse number; and next the processing unit 10 controls the driving signal generating circuit 11 output a second holding current of a second predetermined duration time. The processing unit 10 monitors the output signal of the driving signal generating circuit 11, and when the output signal is the drive pulse signal of the rotary pulse number, the processing unit 10 controls the driving signal generating circuit 11 to output a third holding current of a third predetermined duration time after the drive pulse signal of the rotary pulse number; then the driving signal generating circuit 11 outputs an additional pulse signal of a second predetermined pulse number; and the processing unit 10 controls the driving signal generating circuit 11 to output a fourth holding current of a fourth predetermined duration time. The signal outputted from the driving signal generating circuit 11 is transmitted to the driving circuit 12. The driving circuit 12 performs a power amplification on the signal from the driving signal generating circuit and applies it to the motor 14, so that the motor 14 performs a corresponding action. When the signal outputted from the driving signal generating circuit 11 is a pulse signal, the driving circuit 12 drives the motor 14 to rotate by an angle corresponding to the pulse number of the pulse signal; and when the signal outputted from the driving signal generating circuit 11 is a holding current signal, the driving circuit 12 produces a torque that positions the stator and the rotor of the motor between the stator and rotor magnetic fields of the motor 14.

Every time after the motor is driven to rotate according to the pulse signal of the rotary pulse number, the processing unit 10 stores the desired valve body opening pulse number to serve as the current valve body opening pulse number.

In the disclosure, the holding current is a direct current.

Figure 2:
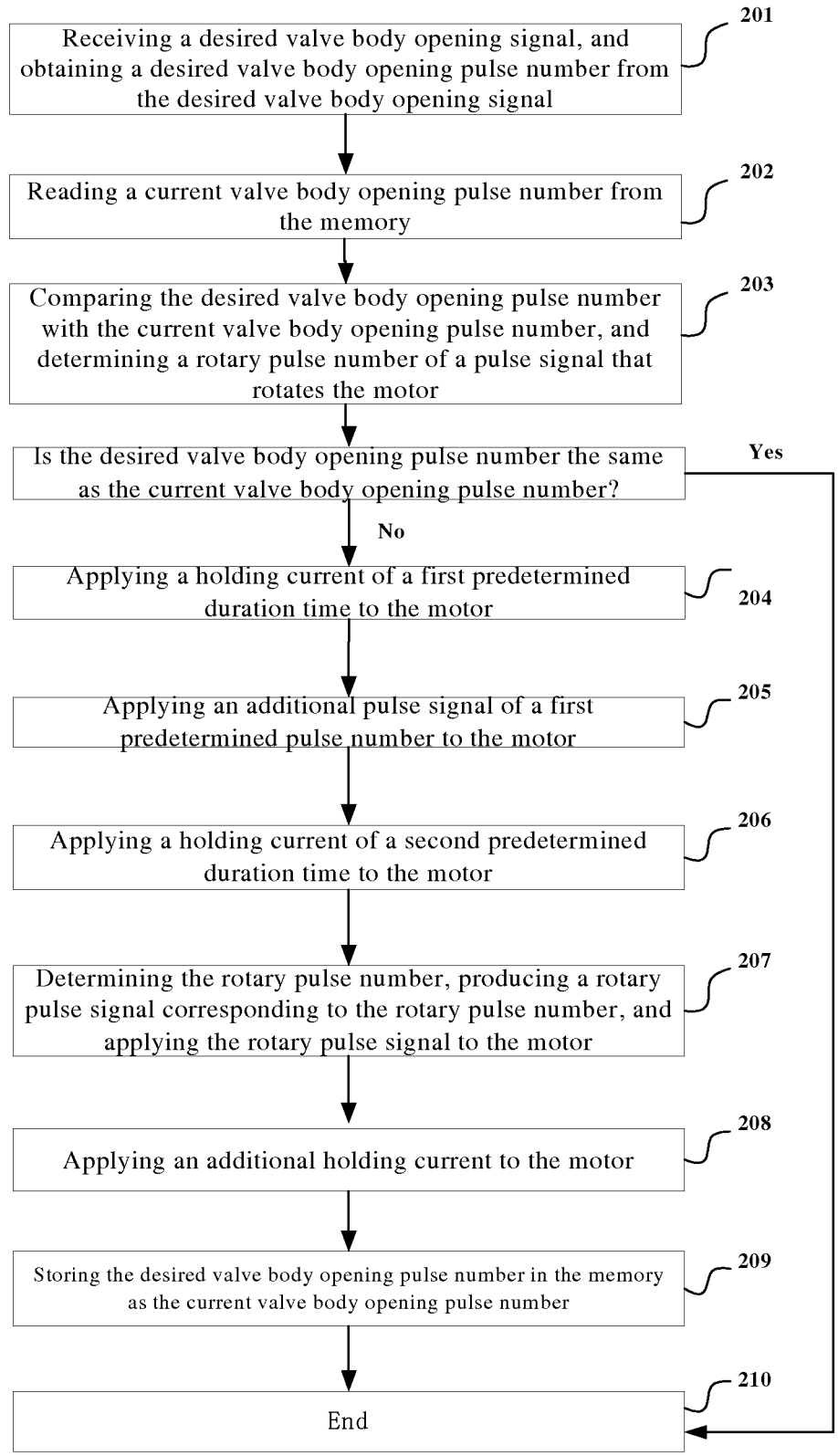
FIG. 2 shows a flow chart of the drive control method for the electronic expansion valve according to one embodiment of the disclosure.

FIG. 2 shows a flow chart of the drive control method for the electronic expansion valve according to one embodiment of the disclosure. As shown in FIG. 2, in the step 201, the processing unit 10 receives a desired valve body opening signal of the electronic expansion valve, and obtains a desired valve body opening pulse number from the desired valve body opening signal. As mentioned above, the desired valve body opening signal is sent out by a master controller of the air conditioning system. If the desired valve body opening signal is a pulse number, the processing unit 10 uses this pulse number as the desired valve body opening pulse number. If the desired valve body opening signal is an angle signal, the processing units 10 converts this angle signal into a pulse number of a pulse signal corresponding to the angle signal denoting the valve body opening according to a predetermined algorithm, and uses it as the desired valve body opening pulse number.

Next, in the step 202, the processing unit 10 reads a current valve body opening pulse number from the memory. The processing unit 10 compares the desired valve body opening pulse number with the current valve body opening pulse number (step 203), and determines a rotary pulse number of a pulse signal required to rotate the motor of the electronic expansion valve when the two pulse numbers are different. If the desired valve body opening pulse number is the same as the current valve body opening pulse number, the flow proceeds to the step 210. If the desired valve body opening pulse number is different from the current valve body opening pulse number, the processing unit 10 controls the driving signal generating circuit 11 to output a first holding current of a first predetermined duration time to the driving circuit 12, which current is applied to the motor of the electronic expansion valve after undergoing a power amplification by the driving circuit 12, a magnetic field is accordingly produced between the rotor and the stator of the motor, and a primary positioning is performed on a relative position between rotor magnetic field of the motor and stator magnetic field using a torque produced by this magnetic field (step 204). Then, the driving signal generating circuit 11 outputs an additional pulse signal of a first predetermined pulse number under control of the processing unit 10, and this additional pulse signal acts on the motor of the electronic expansion valve after undergoing a power amplification by the driving circuit 12 to rotate the motor by a tiny angle (step 205). In the step 206, the processing unit 10 controls the driving signal generating circuit 11 to output a second holding current of a second predetermined duration time, which current is applied to the motor of the electronic expansion valve after undergoing a power amplification by the driving circuit 12, a magnetic field is thus produced between the rotor and the stator of the motor, and a secondary positioning is performed on a relative position between rotor and stator magnetic fields using a torque produced by this magnetic field.

Next, the processing unit 10 controls the driving signal generating circuit 11 to produce a rotary pulse signal corresponding to the rotary pulse number according to the determined rotary pulse number, and inputs it into the driving circuit 12. The rotary pulse signal is applied to the motor of the electronic expansion valve after undergoing a power amplification by the driving circuit 12 to rotate the motor by an angle corresponding to the rotary pulse number (step 207). In the step 208, the processing unit 10 indicates the driving signal generating circuit 11 to produce an additional current, which current is applied to the motor after undergoing a power amplification by the driving circuit 12 to produce a torque. In this embodiment, the step 208 is not necessary. In the step 209, the processing unit 10 stores the desired valve body opening pulse number in the memory to serve as the current valve body opening pulse number, and the flow ends at the step 210.

In this embodiment, the first duration time and the second duration time can be the same or different, but are both at least 50 milliseconds. Alternatively, both times can be 60 milliseconds, 70 milliseconds, 80 milliseconds, 90 milliseconds, 100 milliseconds, etc. However, in order not to overheat the motor, the first duration time and the second duration time had better not exceed 1 second.

In this embodiment, the first predetermined pulse number is preferably 1.

As is well known, according to the characteristics of the electronic expansion valve, the slower the driving rate of the motor is, the larger the excitation torque of the motor is. A large torque contributes to the overcoming of the resistance produced for the reason that the electronic expansion valve has not been used over a long period of time or there is oil or a foreign matter adhered or blocked in the valve body at the start of the motor, so that a relative position of the rotor and the stator of the motor can be positioned. Thus, in this embodiment, in order to overcome the defect that the electronic expansion valve cannot be effectively driven due to an insufficient starting torque of the motor and the defect that the start is out of step due to the deviation of the relative position between the rotor and the stator, before starting the motor according to the rotary pulse number, firstly a holding current of a first duration time is applied to the motor, then a pulse signal of an additional pulse number is applied to the motor, and further a holding current of a second duration time is applied to the motor. In this case, a large excitation torque is produced on the motor using a secondarily applied holding current of a duration time, which overcomes the resistance of the motor and operates twice positioning of a relative position between the rotor and the stator of the motor. In this case, when a pulse signal corresponding to the rotary pulse number is applied to the motor, the valve body opening of the electronic expansion valve can be correctly controlled.

Figure 3:
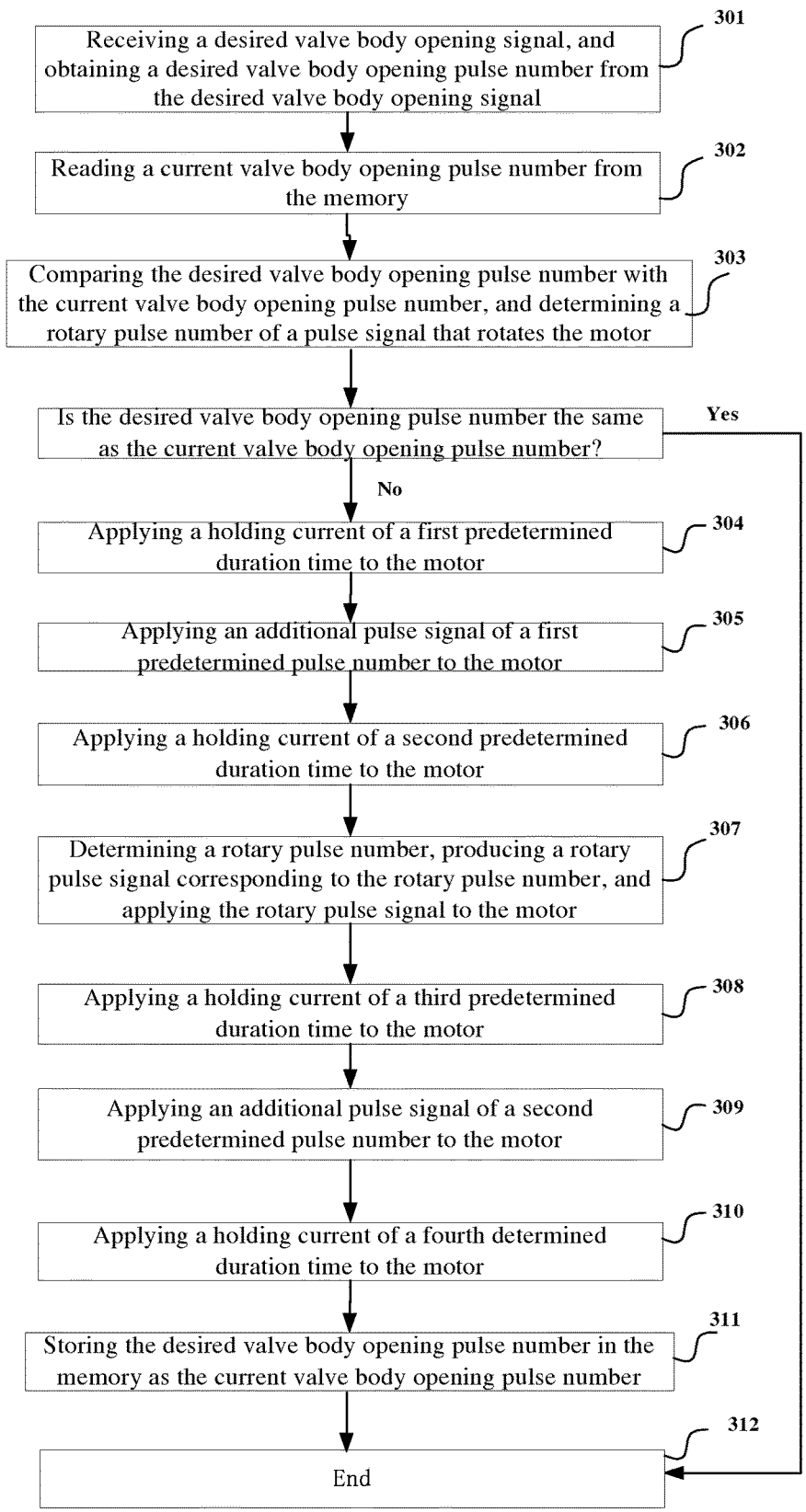
FIG. 3 shows a flow chart of the drive control method for the electronic expansion valve according to another embodiment of the disclosure.

FIG. 3 shows a flow chart of the drive control method for the electronic expansion valve according to another embodiment of the disclosure. In the step 301, as in the step 201, the processing unit 10 receives a desired valve body opening signal of the electronic expansion valve, and obtains a desired valve body opening pulse number from the desired valve body opening signal. Next, in the step 302, the processing unit 10 reads a current valve body opening pulse number from the memory. The processing unit 10 compares the desired valve body opening pulse number with the current valve body opening pulse number (step 303), and determines a rotary pulse number of a pulse signal required to rotate the motor of the electronic expansion valve when the two pulse numbers are different. If the desired valve body opening pulse number is the same as the current valve body opening pulse number, the flow proceeds to the step 312. If the desired valve body opening pulse number is different from the current valve body opening pulse number, the processing unit 10 controls the driving signal generating circuit 11 to output a first holding current of a first predetermined duration time to the driving circuit 12, which current is applied to the motor of the electronic expansion valve after undergoing a power amplification by the driving circuit 12, a magnetic field is produced between the rotor and the stator of the motor, and a primary positioning is performed on a position between the rotor and the stator using a torque produced by this magnetic field (step 304). Then, the driving signal generating circuit 11 outputs an additional pulse signal of a first predetermined pulse number under control of the processing unit 10, and this additional pulse signal acts on the motor of the electronic expansion valve after undergoing a power amplification by the driving circuit 12 to rotate the motor by a tiny angle (step 305). In the step 306, the processing unit 10 controls the driving signal generating circuit 11 again to output a second holding current of a second predetermined duration time, which current is applied to the motor of the electronic expansion valve after undergoing a power amplification by the driving circuit 12, a magnetic field is produced between the rotor and the stator of the motor, and a secondary positioning is performed on a position between the rotor and the stator using a torque produced by this magnetic field.

Next, the processing unit 10 controls the driving signal generating circuit 11 to produce a rotary pulse signal corresponding to the rotary pulse number based on the determined rotary pulse number, and inputs it into the driving circuit 12. The rotary pulse signal is applied to the motor of the electronic expansion valve after undergoing a power amplification by the driving circuit 12 to rotate the motor by an angle corresponding to the rotary pulse number (step 307).

After the motor of the electronic expansion valve is rotated by an angle corresponding to the rotary pulse number, in the step 308, the processing unit 10 controls the driving signal generating circuit 11 to output a third holding current of a third predetermined duration time to the driving circuit 12, which current is applied to the motor of the electronic expansion valve after undergoing a power amplification by the driving circuit 12, a magnetic field is produced between the rotor and the stator of the motor, and a primary positioning is performed on a position between the rotor and the stator using a torque produced by this magnetic field. Then, the driving signal generating circuit 11 outputs an additional pulse signal of a second predetermined pulse number under control of the processing unit 10, and this additional pulse signal acts on the motor of the electronic expansion valve after undergoing a power amplification by the driving circuit 12 to rotate the motor by a tiny angle (step 309). In the step 310, the processing unit 10 controls the driving signal generating circuit 11 again to output a fourth holding current of a fourth predetermined duration time, which current is applied to the motor of the electronic expansion valve after undergoing a power amplification by the driving circuit 12, a magnetic field is produced between the rotor and the stator of the motor, and a secondary positioning is performed on a position between the rotor and the stator using a torque produced by this magnetic field. In the step 311, the processing unit 10 stores the desired valve body opening pulse number in the memory to serve as the current valve body opening pulse number, and the flow ends at the step 312.

In this embodiment, the first through fourth duration times can be the same or different, but are all at least 50 milliseconds. Alternatively, each of the first through fourth duration times can be 60 milliseconds, 70 milliseconds, 80 milliseconds, 90 milliseconds, 100 milliseconds, etc. However, in order not to overheat the motor, each of the first through fourth duration times had better not exceed 1 second.

In this embodiment, the first predetermined pulse number and the second predetermined pulse number are both 1.

In this embodiment, not only a secondary positioning is performed on the motor of the electronic expansion valve before starting the electronic expansion valve as in the embodiment shown in FIG. 2 to overcome the defect that the electronic expansion valve cannot be effectively driven due to an insufficient starting torque of the motor and the defect that the start is out of step due to the deviation of the relative position between the rotor and the stator, but also a secondary positioning is performed on the motor of the electronic expansion valve again after applying a rotary pulse number to the motor of the electronic expansion valve to enhance the torque of the motor to achieve that the rotor of the motor of the electronic expansion valve will not be displaced due to a refrigerant pressure change and the like after the stop of the motor.

FIG. 4 shows a flow chart of the drive control method for the electronic expansion valve according to a further embodiment of the disclosure. As shown in FIG. 4, as in the step 201, the processing unit 10 receives a desired valve body opening signal of the electronic expansion valve, and obtains a desired valve body opening pulse number from the desired valve body opening signal. Next, in the step 402, the processing unit 10 reads a current valve body opening pulse number from the memory. The processing unit 10 compares the desired valve body opening pulse number with the current valve body opening pulse number (step 403), and determines a rotary pulse number of a pulse signal required to rotate the motor of the electronic expansion valve when the two pulse numbers are different. If the desired valve body opening pulse number is the same as the current valve body opening pulse number, the flow proceeds to the step 409. If the desired valve body opening pulse number is different from the current valve body opening pulse number, the processing unit 10 controls the driving signal generating circuit 11 to produce a rotary pulse signal corresponding to the rotary pulse number based on the determined rotary pulse number, and inputs it into the driving circuit 12. The rotary pulse signal is applied to the motor of the electronic expansion valve after undergoing a power amplification by the driving circuit 12 to rotate the motor by an angle corresponding to the rotary pulse number (step 404). Optionally, before the step 404, the processing unit 10 controls the driving signal generating circuit 11 to output a first holding current of a first predetermined duration time to the driving circuit 12, which current is applied to the motor of the electronic expansion valve after undergoing a power amplification by the driving circuit 12, a magnetic field is accordingly produced between the rotor and the stator of the motor, and a primary positioning is performed on a position between the rotor and the stator using a torque produced by this magnetic field.

After the motor of the electronic expansion valve is rotated by an angle corresponding to the rotary pulse number, in the step 405, the processing unit 10 controls the driving signal generating circuit 11 to output a third holding current of a third predetermined duration time to the driving circuit 12, which current is applied to the motor of the electronic expansion valve after undergoing a power amplification by the driving circuit 12, a magnetic field is produced between the rotor and the stator of the motor, and a primary positioning is performed on a position between the rotor and the stator using a torque produced by this magnetic field. Then, the driving signal generating circuit 11 outputs an additional pulse signal of a second predetermined pulse number under control of the processing unit 10, and this additional pulse signal acts on the motor of the electronic expansion valve after undergoing a power amplification by the driving circuit 12 to rotate the motor by a tiny angle (step 406). In the step 407, the processing unit 10 controls the driving signal generating circuit 11 again to output a fourth holding current of a fourth predetermined duration time, which current is applied to the motor of the electronic expansion valve after undergoing a power amplification by the driving circuit 12, a magnetic field is accordingly produced between the rotor and the stator of the motor, and a secondary positioning is performed on a position between the rotor and the stator using a torque produced by this magnetic field. In the step 408, the processing unit 10 stores the desired valve body opening pulse number in the memory to serve as the current valve body opening pulse number, and the flow ends at the step 409.

In this embodiment, the first, third and fourth duration times can be the same or different, but are all at least 50 milliseconds. Alternatively, each of the first, third and fourth duration times can be 60 milliseconds, 70 milliseconds, 80 milliseconds, 90 milliseconds, 100 milliseconds, etc. However, in order not to overheat the motor, each of the first, third and fourth duration times had better not exceed 1 second.

In this embodiment, the second predetermined pulse number is preferably 1.

In this embodiment, after applying a rotary pulse number to the motor of the electronic expansion valve, a secondary positioning is performed on the motor of the electronic expansion valve again to enhance the torque of the motor to achieve that the rotor of the motor of the electronic expansion valve will not be displaced due to a refrigerant pressure change and the like after the stop of the motor. Further, before applying the rotary pulse number to the motor of the electronic expansion valve, the holding current of the first duration time makes the motor produce a large torque to overcome the resistance, which also contributes to the correct start of the electronic expansion valve.

The above contents are only some implementation modes of the disclosure, and it should be noted that those skilled in the art can also make some improvements and decorations without departing from the principle of the disclosure, and these improvements and decorations shall also be deemed as ones within the scope of protection of the disclosure.

The invention claimed is:

1. A drive control device for an electronic expansion valve, comprising:
   a processing unit for receiving a desired valve body opening signal of the electronic expansion valve and determining a desired valve body opening pulse number according to the desired valve body opening signal, and obtaining a rotary pulse number of a pulse signal required to rotate a motor of the electronic expansion valve based on the desired valve body opening pulse number and a current valve body opening pulse number;
   a driving signal generating circuit for producing an additional pulse signal of a predetermined pulse number and producing a drive pulse signal of a corresponding pulse number according to the rotary pulse number under control of the processing unit, and producing a holding current of a predetermined duration time under control of the processing unit; and
   a driving circuit for performing power amplifications on the additional pulse signal and the drive pulse signal respectively and applying them to the motor to rotate the motor, and performing a power amplification on the holding current of the predetermined duration time outputted from the driving signal generating circuit and applying it to the motor to produce a torque that achieves positioning a relative position between stator and rotor magnetic fields of the motor.

2. The drive control device according to claim 1, wherein the driving signal generating circuit producing a holding current of a predetermined duration time under control of the processing unit comprises:
   the driving signal generating circuit producing a first holding current of a first predetermined duration time when the processing unit determines that the desired valve body opening pulse number is not equal to the current valve body opening pulse number; and
   the driving signal generating circuit producing a second holding current of a second predetermined duration time after the driving circuit drives the motor according to an additional pulse signal of a first predetermined pulse number.

3. The drive control device according to claim 1, the driving signal generating circuit producing a holding current of a predetermined duration time under control of the processing unit comprising:
   the driving signal generating circuit producing a third holding current of a third predetermined duration time after the driving circuit drives the motor according to the drive pulse signal; and
   the driving signal generating circuit producing a fourth holding current of a fourth predetermined duration time after the driving circuit drives the motor according to an additional pulse signal of a second predetermined pulse number.

4. The drive control device according to claim 3, wherein each of the first through fourth predetermined duration times is 50 milliseconds to 1 second.

5. The drive control device according to claim 4, further comprising:
   a memory for storing the desired valve body opening pulse number and using it as the current valve body opening pulse number.

6. A drive control method for an electronic expansion valve, comprising the steps of:
   receiving a desired valve body opening signal of the electronic expansion valve, and determining a desired valve body opening pulse number according to the desired valve body opening signal;
   applying a first holding current of a first predetermined duration time to a motor to produce a torque that achieves positioning a relative position between stator and rotor magnetic fields of the motor when the desired valve body opening pulse number is different from a current valve body opening pulse number;
   applying a first additional pulse signal of a first predetermined pulse number to the motor of the electronic expansion valve after performing a power amplification thereon, and then applying a second holding current of a second predetermined duration time to the motor to produce a torque that achieves positioning a relative position between stator and rotor magnetic fields of the motor; and
   determining a rotary pulse number that the motor to be rotated according to the desired valve body opening pulse number and the current valve body opening pulse number, producing a drive pulse signal corresponding to the rotary pulse number based on the rotary pulse number, and applying the drive pulse signal to the motor of the electronic expansion valve after performing a power amplification thereon.

7. The drive control method according to claim 6, wherein receiving a desired valve body opening signal of the electronic expansion valve and determining a desired valve body opening pulse number according to the desired valve body opening signal comprises:
   using, if the desired valve body opening signal is a pulse number, the pulse number as the desired valve body opening pulse number; or
   converting, if the desired valve body opening signal is an angle signal, the angle signal into a pulse number of a pulse signal corresponding to the angle signal according to a predetermined algorithm, and using it as the desired valve body opening pulse number.

8. The drive control method according to claim 6, wherein the current valve body opening pulse number is stored in a memory.

9. The drive control method according to claim 6, further comprising:

storing the desired valve body opening pulse number in the memory to serve as the current valve body opening pulse number.

10. The drive control method according to claim 6, after producing a drive pulse signal corresponding to the rotary pulse number based on the rotary pulse number, and applying the drive pulse signal to the motor of the electronic expansion valve after performing a power amplification thereon, further comprising:

applying a third holding current of a third predetermined duration time to the motor to produce a torque that achieves positioning a relative position between stator and rotor magnetic fields of the motor.

11. The drive control method according to claim 10, after applying a third holding current of a third predetermined duration time to the motor to produce a torque that achieves positioning a relative position between stator and rotor magnetic fields of the motor, further comprising:

applying a second additional pulse signal of a second predetermined pulse number to the motor of the electronic expansion valve, and then applying a fourth holding current of a fourth predetermined duration time to the motor to produce a torque that achieves positioning a relative position between stator and rotor magnetic fields of the motor.

12. The drive control method according to claim 11, wherein each of the first and second predetermined pulse numbers is 1.

13. The drive control method according to claim 10, wherein each of the first through fourth duration times is 50 milliseconds to 1 second.

* * * * *